Figure 1:
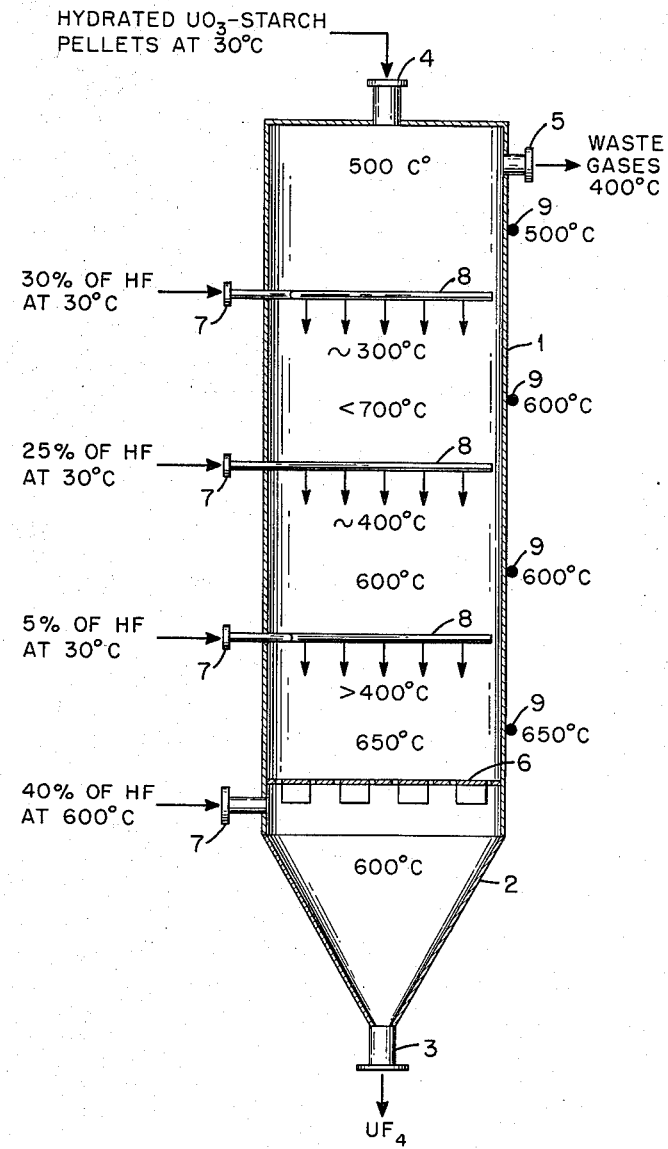

INVENTOR.
James E. Moore

2,944,873
Patented July 12, 1960

2,944,873
SINGLE-STEP CONVERSION OF UO₃ TO UF₄

James E. Moore, Pittsburgh, Pa., assignor to the United States of America as represented by the United States Atomic Energy Commission Filed July 31, 1958, Ser. No. 752,386

4 Claims. (Cl. 23—14.5)

My invention relates to the processing of uranium and more particularly to a process for the preparation of uranium tetrafluoride from hexavalent uranium.

Uranium tetrafluoride is an important intermediate in the production of uranium metal and of certain compounds of uranium such as uranium hexafluoride. Uranium as obtained from the purification of crude ores and from the chemical reprocessing of uranium-bearing fuel elements is generally in the hexavalent form, being contained in such compounds as uranium trioxide, uranyl nitrate and ammonium diuranate. Both in the conversion of this hexavalent uranium to uranium metal and in the preparation of uranium hexafluoride for isotopic separation by means of gaseous diffusion, the hexavalent uranium is first converted to uranium tetrafluoride. The $UF_4$ may then be reduced to metallic uranium or fluorinated to produce $UF_6$.

Uranium tetrafluoride previously has been prepared from uranium trioxide in a two-step process comprising reducing the uranium trioxide to uranium dioxide with hydrogen and subsequently hydrofluorinating the $UO_2$ to form $UF_4$. While $UF_4$ may be prepared by this method, certain disadvantages are presented. Separate reactors are required for the reduction and hydrofluorination steps, and each reactor presents severe engineering problems. Both of the reactions involved are highly exothermic, and the uranium powders involved exhibit unfavorable heat transfer characteristics and relatively low sintering temperatures. The reduction reaction in this method proceeds readily at temperatures above 1000° F. The hydrofluorination reaction, however, is highly sensitive to the conditions employed in the reduction reaction. The efficiency of the hydrofluorination reaction depends primarily on the surface area of the $UO_2$ powder, which in turn is adversely affected by excessive reduction temperatures resulting from the localized overheating encountered in conventional gas-solid reaction vessels. Satisfactory control of the reduction reaction has required fluidized-bed type reactors, in which localized overheating is minimized.

In addition to the engineering difficulties encountered with the two-step preparation of $UF_4$ from $UO_3$, this method has proven costly because of inefficient utilization of HF in the hydrofluorination step. An anhydrous HF excess of at least 100 percent has been required, and the excess HF is not suitable for recycle because of contamination with off-gas water vapor. Another disadvantage has been the relatively low unit capacities of the equipment required by this method.

It is, therefore, an object of my invention to provide a simplified method of preparing $UF_4$ from hexavalent uranium.

Another object is to provide a one-step method of preparing $UF_4$ from $UO_3$.

Another object is to provide a method of preparing $UF_4$ from $UO_3$ in which efficient utilization of HF is obtained.

Other objects and advantages of my invention will be apparent from the following detailed description.

In accordance with my invention $UF_4$ may be prepared from hexavalent uranium by contacting the hexavalent uranium with a polysaccharide and HF at an elevated temperature. Reduction and hydrofluorination are obtained simultaneously, and only one reaction vessel is required. By contacting a pelletized mixture of the polysaccharide and hexavalent uranium with HF, a high degree of conversion to $UF_4$ is obtained. In addition HF efficiency is substantially higher than in the previous two-step method. This method is especially suitable for large-scale production because of the high unit capacities obtainable in the process equipment.

Although my invention is not to be understood as restricted to a particular theory, the reduction of hexavalent uranium is postulated to occur as a result of a reaction with carbon liberated by the decomposition of the polysaccharide at elevated temperatures. The overall reactions may be represented by the following equations.

$$6UO_3 + C_6H_{10}O_5 + 24HF \rightarrow 6UF_4 + 6CO + 17H_2O$$
$$6UO_2F_2 + C_6H_{10}O_5 + 12HF \rightarrow 6UF_4 + 6CO + 11H_2O$$

In addition a minor proportion of carbon dioxide is formed as a reaction by-product.

Numerous organic carbonaceous materials which yield finely divided carbon upon decomposition at elevated temperatures may be employed to reduce hexavalent uranium. In order to obtain complete reduction and conversion to $UF_4$, however, the carbonaceous material must be capable of forming a mixture with the hexavalent uranium in a form suitable for maintaining contact with the gaseous HF throughout the course of the reaction. I have found that a suitable feed mixture may be obtained by employing a polysaccharide, such as starch, as the reducing agent and by combining the polysaccharide with the hexavalent uranium and water to form hydrated pellets. The polysaccharide serves both as a reducing agent and as a binder to maintain the pellets in discrete form during the reaction.

Suitable polysaccharides are those which are incompletely soluble in water but are at least swelled by water. Such polysaccharides may be hexosans such as glucans, galactans and mannans or pentosans such as xylans and arabans, and include such compounds in naturally occurring forms or mixtures such as hemicelluloses, pectins, starches and dextrins. In view of their ready availability starches in general and cornstarch in particular are preferred. Other examples of suitable starches are arrowroot starch, tapioca starch and potato starch.

Although my invention is applicable generally to the reduction of hexavalent uranium, it is preferred to employ uranium trioxide as the uranium feed material. The uranium may also be in the form of uranyl fluoride, and this compound is formed as an intermediate in the reduction of $UO_3$. Other hexavalent uranium compounds, such as uranyl nitrate and ammonium diuranate may also be employed. However, it is preferred to convert these compounds to $UO_3$ by contacting them with air heated to approximately 400° C., with the resulting $UO_3$ being used as the uranium feed material.

Suitable hydrated feed pellets may be prepared by the following procedure, exemplified with reference to cornstarch and $UO_3$. Finely divided cornstarch and $UO_3$ are dry-mixed thoroughly in a weight ratio of approximately 12 parts $UO_3$ to one part cornstarch. This amount of cornstarch represents 90 percent of the stoichiometric amount of carbon required to convert the available oxygen to carbon monoxide. Approximately 15 percent by weight of water is added to the dry $UO_3$-starch mixture and the resulting mass is stirred thoroughly to form a dough-like mixture. This mixture is then extruded to form small pellets. The pellets are allowed to harden and are screened to final size of ¼ inch diameter. A similar procedure may be employed for other forms of hexavalent uranium and other polysaccharides.

The proportions of the various reactants are not critical to my invention. In order to keep the carbon content of product $UF_4$ to a minimum, however, it is preferred to employ a stoichiometric deficiency of the polysaccharide with respect to the amount required to convert all the available oxygen to carbon monoxide. Approximately 80 to 90 percent of the stoichiometric amount of the polysaccharide provides minimum carbon content in the product, consistent with high efficiency in the process. Essentially complete reduction is obtained with this proportion, since the deficiency is compensated for by the formation of carbon dioxide. The preferred proportion of HF to be contacted with the pellets is within the range from approximately stoichiometric to an excess of 10 percent.

Conversion of the hydrated pellets to $UF_4$ may be accomplished readily by disposing the pellets in a bed and introducing heated HF into the bed. In order to maintain control over the reaction temperature, it is preferred to employ a vertical moving-bed type reactor into which the pellets are continuously fed at the top, and the product $UF_4$ is withdrawn at the bottom. The temperature gradient within the bed may be controlled by introducing the HF into the bed at a plurality of vertically spaced points, with the temperature of the HF being adjusted to provide the desired bed temperature at the portion of the bed involved. A temperature above 400° C. is required for the reaction and a temperature gradient in the bed from approximately 500° C. to 700° C. is preferred. Higher temperatures result in decreased yields because of sintering effects. Once the reaction is initiated in the upper portion of the reactor, the heat evolved is sufficient that the reaction may be conducted without heating the reaction mass except at the lowermost portion of the reactor. Accordingly, the HF is then introduced into the upper portions of the reactor at room temperature. In order to insure essentially complete conversion of $UF_4$, approximately 40 to 50 percent of the HF is introduced into the reactor at the lowermost portion at a temperature of approximately 600° C. Under these conditions, the temperature of the bed is maintained at approximately 700° C. at its hottest portion in the center. These temperatures may be maintained by externally heating the reactor walls to prevent heat loss. At these temperatures one to three hours retention time in the reactor is required for essentially complete conversion of the pellets to $UF_4$.

A schematic diagram of a suitable moving-bed reactor for the process of my invention may be seen by reference to Fig. 1. The reactor comprises a vertically disposed cylinder 1 provided with a conical bottom portion 2 terminating in an outlet 3 for egress of $UF_4$ pellets. The top of the reactor 1 is provided with a centrally disposed inlet 4 for the admission of $UO_3$-starch pellets, and is provided also with an outlet 5 for the withdrawal of by-product gases and any unreacted HF. A perforated distributor plate 6 is mounted within the lower part of the reactor, normal to its major axis, to promote uniform solids flow. The reactor 1 is operated with a temperature gradient so that the feed pellets move by gravity through a succession of temperature zones. Four vertically spaced side inlets 7 are provided for the admission of HF to all but the solids inlet zone of the reactor. The HF inlets 7 are connected individually to perforated distributor nozzles 8 which are disposed normal to the major axis of the reactor with the perforations extending downward and which are staggered to cause minimum impedance to the flow of pellets. At the upper zones of the reactor the HF is introduced at room temperature once the reaction is initiated, since a major portion of the heat of reaction is released in these zones. This low-temperature HF serves to cool the reaction mass to the temperatures indicated below each distributor nozzle. In the lowermost zone of the reactor, where little heat is evolved by the reactions, the HF is introduced at a temperature of 600° C. to provide essentially complete conversion to $UF_4$. Approximately 40 percent of the HF is introduced through the lowermost inlet, and amounts of 30, 25, and 5 percent, respectively, are introduced through the upper three inlets in vertically descending order. The exit gases are withdrawn at a temperature of at least approximately 400° C. to prevent deposition of carbon on the feed pellets. The reactor is provided with wall heaters 9 and insulation (not shown) to prevent loss of heat through the reactor walls. In order to withstand attack by the HF at the elevated temperatures involved, the apparatus must be constructed of high temperature corrosion-resistant material, such as a nickel-base alloy containing chromium and iron and referred to under the trade name "Inconel" or a nickel-base alloy containing molybdenum and iron and referred to under the trade name "Hasteloy".

My invention is further illustrated by the following specific examples.

EXAMPLE I

A continuous $UF_4$ preparation run was conducted by introducing HF and hydrated $UO_3$-starch pellets into a moving bed reactor of the type described with reference to Fig. 1. Feed pellets for the run were prepared by mixing 180 lbs. of $UO_3$, 15 lbs. of cornstarch and 30 lbs. of water, extruding the resulting dough through a three-mesh screen, allowing the extruded pellets to harden, and screening out fines of eight mesh and below. The moving bed reactor was four inches in diameter and five feet long. The reactor was provided with wall heaters and HF inlets at the bottom and at three vertically spaced intervals. Forty percent of the HF was introduced through the lowermost inlet at 600° C., and the remaining 60 percent was introduced through the three upper inlets at room temperature. The average temperature of the lower 60 percent of the bed varied from 540° C. to 611° C. The pellets were fed continuously into an inlet at the top of the reactor at a rate of approximately 17 lbs. per hour for the 13 hours duration of the run. The product obtained after nine hours and at one-hour intervals thereafter was recovered and analyzed to determine the percentage of reduced uranium in the product and the percentage of reduced uranium which had been converted to $UF_4$. The results obtained may be seen by reference to the following table.

Table I

CONTINUOUS PRODUCTION OF $UF_4$

| Hours After Start of Run | Average Retention Time (Hours) | HF Feed | | Average Temp., Lower 60% of bed, ° C. | Product Wt., Lbs. | Analysis, Wt. Percent | | | Percent Conversion | |
| | | Lbs. | Percent Stoichiometric | | | U Total | U+4 | F- | Reduction | Hydrofluorination |
|---|---|---|---|---|---|---|---|---|---|---|
| 9 | 2.1 | 45 | 112 | 572 | 152.7 | 75.9 | 74.9 | 24.0 | 98.7 | 99.2 |
| 10 | 1.3 | 7.0 | 105 | 560 | 29.7 | 76.0 | 72.1 | 23.8 | 95.0 | 98.4 |
| 11 | 1.3 | 7.5 | 110 | 590 | 28.6 | 75.9 | 75.4 | 24.0 | 99.2 | 99.2 |
| 12 | 3.3 | 8.0 | 112 | 611 | 16.0 | 74.6 | 72.4 | 23.9 | 97.2 | 98.8 |
| 13 | 2.0 | 7.5 | 170 | 540 | 19.5 | 76.1 | 75.1 | 24.0 | 98.7 | 99.2 |

It may be seen from Table I that essentially complete conversion to UF₄ was obtained, even at an HF excess of only 5%.

EXAMPLE II

Additional UF₄ preparation runs were conducted, with the apparatus and procedure of Example I being employed. The results obtained may be seen by reference to Table II.

*Table II*

UF$_4$ PRODUCTION RUNS

| Run Period (Hours) | Retention Time (Hours) | Starch to UO$_3$, Wt. Ratio | HF Feed (Percent Stoich.) | Average Temp., Lower 60% of bed, °C. | Product Wt. (lb.) | Conversion (Percent) | |
|---|---|---|---|---|---|---|---|
| | | | | | | Reduction | Hydrofluorination |
| 11 | 5 | 0.083 | 112 | 630 | 105 | 99.3 | 99.3 |
| 12 | 2 | 0.080 | 117 | 600 | 230 | 98.0 | 99.3 |
| 13 | 2.7 | 0.080 | 148 | 465 | 158 | 95.8 | 96.8 |
| 6 | 3.2 | 0.080 | 102 | 410 | 82 | 94.1 | 95.9 |
| 4 | 3.3 | 0.080 | 130 | 370 | 46 | 94.6 | 91.3 |

It may be seen from Table II that the reaction efficiency, both with respect to reduction and hydrofluorination, is decreased with decreasing temperatures of less than 500° C. in the lower portion of the bed.

It is to be understood that the above examples are merely illustrative and are not to be construed as limiting the scope of my invention, which is limited only as indicated by the appended claims. It is also to be understood that many variations in apparatus and procedure may be employed without departing from the scope of my invention.

Having thus described my invention, I claim:

1. A method for the conversion of hexavalent uranium compounds to uranium tetrafluoride which comprises contacting said compounds with a polysaccharide and hydrogen fluoride at an elevated temperature and recovering the uranium tetrafluoride formed thereby.

2. A method for the conversion of hexavalent uranium compounds to uranium tetrafluoride which comprises intimately mixing said compounds with a water-swellable polysaccharide and water, pelletizing the resulting mixture, contacting the resulting hydrated pellets with hydrogen fluoride at a temperature above 400° C. and recovering the uranium tetrafluoride formed thereby.

3. The method of claim 2 wherein said polysaccharide is a starch.

4. A continuous method for the conversion of uranium trioxide to uranium tetrafluoride which comprises intimately mixing said uranium trioxide with starch and water, pelletizing the resulting mixture, continuously introducing said hydrated pellets into the top of a vertical reactor, countercurrently contacting the resulting pellet bed with hydrogen fluoride introduced into said reactor at a plurality of points, the temperature of the hydrogen fluoride at each of said introduction points being such as to maintain a temperature within the range of 500° C. to 700° C. within the reactor and continuously withdrawing the resulting uranium tetrafluoride and the resulting gaseous reaction products.

References Cited in the file of this patent

Katz et al.: "Chemistry of Uranium" (1951), pages 362–364.

Briggs: NLCO–682, Aug. 8, 1956, pages 5–8, 16–19, 23, 24.